Figures 1, 2:
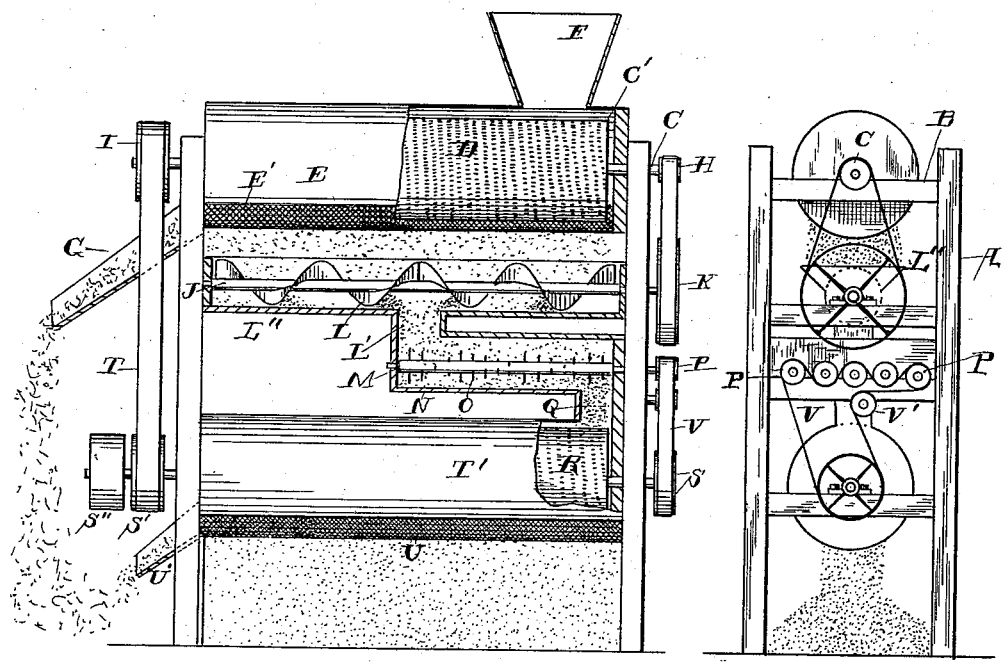

(No Model.)

R. B. HUTCHCRAFT.
SEED CLEANER AND HULLER.

No. 322,824. Patented July 21, 1885.

WITNESSES:  INVENTOR:

UNITED STATES PATENT OFFICE.

R. BRENT HUTCHCRAFT, OF PARIS, KENTUCKY.

SEED CLEANER AND HULLER.

SPECIFICATION forming part of Letters Patent No. 322,824, dated July 21, 1885.

Application filed August 14, 1884. (No model.)

*To all whom it may concern:*

Be it known that I, R. BRENT HUTCHCRAFT, of Paris, in the county of Bourbon and State of Kentucky, have invented a new and useful Improvement in Seed Cleaners and Hullers, which improvement is fully set forth in the following specification and accompanying drawings, in which—

Figure 1 is a side view, partly in section, of my improved seed cleaner and huller. Fig. 2 is an end view of the same.

This invention relates to an improvement in seed cleaners and hullers, which will be fully understood from the following description, when taken in connection with the annexed drawings:

A designates a suitable frame, and C is a shaft journaled in said frame at the upper end thereof. This shaft C is provided with a cylinder, C', of sheet metal, preferably having a series of spiral corrugations or abrading surfaces, D, extending from one end of the cylinder to the other. Around this cylinder C', I provide a shell, E, the lower part of which is formed with perforations E', or, if desired, with a screen or sieve; and a hopper, F, is provided above at one end and an outlet, G, at the opposite end of said cylinder. One end of the shaft C has a pulley, H, and the other end a pulley, I, keyed on it.

Immediately beneath the cylinder C', I provide a shaft, J, having at one end a pulley, K, communicating with the pulley H by a belt. The shaft J is provided with a right and left conveyer, L, working in a box or trough, L'', having a central opening, L', to convey the seed centrally through said opening.

Immediately beneath the opening L', I provide a series of shafts, M, journaled in the ends of the box N. These shafts are arranged in a horizontal plane, and have pins or beaters O fixed spirally in them. The outer end of each one of the shafts M is provided with a pulley, P. Within the box N, at the opposite end from the opening L', I provide an opening, Q, extending downwardly.

At any convenient distance beneath the shafts M, I provide a shaft and cylinder similar to the upper cylinder, C', having at one end a pulley, S, and at the opposite end two pulleys, S' S''. A belt, T, communicates with the pulley I above. This lower cylinder, R, is also surrounded by a shell or concave, T, having a screen, U, which is provided with smaller perforations than the upper screen, E', for the purpose hereinafter explained. At the opposite end of the shell T' from the opening Q, I provide an outlet or chute, U', for discharging the chaff. A belt, V, passes around the pulley S, extending to and alternating over and under the series of pulleys P at the ends of the shafts M. An idler-wheel, V', is placed intermediate at any convenient point to produce a tension on said belt V. The pulley S'' at the opposite end of the shaft is designed to communicate power by means of a belt. (Not shown in the annexed drawings.)

In operating this machine the seed with chaff is placed within the hopper F, and in passing down and around the cylinder C' the seed is separated from the chaff, and passes through the openings in the screen E'. For this purpose this screen E is designed to be provided with perforations of such a size as to admit of the passage of the seed. The spiral corrugations on the cylinder C' convey the chaff through the chute G. The seed which pass through the concave are conveyed inwardly by the conveyer L from the ends of the box L'' and discharged through the opening L'. The shafts M, bearing the beaters, revolve in opposite directions, and serve to remove the remainder of the chaff from the seed, and at the same time convey the seed toward and through the opening Q to the cylinder R. The concave U is provided with smaller perforations than the upper concave, E', which permit the smaller and imperfect seed to pass into a receptacle beneath, the larger and perfect seed passing off through the opening U'.

At any stage of the progress of the seed after leaving the cylinder C' provision may be made for introducing a blast of air through the machine for removing the dust. This feature is not shown in the drawings, as I do not at all times find it necessary. The lower cylinder, R, while designed principally for carrying the seed through it, will also assist in cleaning or removing the last remnant of the chaff from the seed.

What I claim is—

1. The combination of the cylinder having corrugations spirally disposed, the shell or concave having perforations through its lower part and at the end a chute, the box or trough L", having a central opening, L', the right and left conveyer, the box N, and the series of beater-shafts M, substantially as described.

2. The combination of the upper cylinder provided with corrugations spirally disposed, the outer perforated shell, the right and left conveyer, the box or trough L", having a central opening, the box N, having an opening, Q, a series of shafts having spirally-disposed beaters, the lower cylinder having corrugations, and an outer shell provided beneath with smaller perforations than those in the upper shell, the whole arranged to operate as described.

In testimony that I claim the foregoing I have hereunto set my hand, this 19th day of May, 1884, in the presence of witnesses.

R. BRENT HUTCHCRAFT.

Witnesses:
F. R. ARMSTRONG,
W. H. MCMILLAN.